United States Patent [19]
Vanka et al.

[11] Patent Number: 5,699,540
[45] Date of Patent: Dec. 16, 1997

[54] PSEUDO-CONCURRENT ACCESS TO A CACHED SHARED RESOURCE

[75] Inventors: Subbarao Vanka, Portland, Oreg.; Abid Ahmad, Folsom, Calif.

[73] Assignee: Intel Corporation, Santa Clara, Calif.

[21] Appl. No.: 410,010

[22] Filed: Mar. 23, 1995

Related U.S. Application Data

[63] Continuation of Ser. No. 977,228, Nov. 16, 1992, abandoned.

[51] Int. Cl.⁶ ...................................................... G06F 12/00
[52] U.S. Cl. ........................ 395/403; 395/457; 395/473; 395/477; 395/495
[58] Field of Search ................................. 394/403, 457, 394/473, 477, 495

[56] References Cited

U.S. PATENT DOCUMENTS

| | | | |
|---|---|---|---|
| 4,912,632 | 3/1990 | Gach et al. | 395/848 |
| 5,129,090 | 7/1992 | Bland et al. | 395/294 |
| 5,214,775 | 5/1993 | Yabushita et al. | 395/444 |
| 5,291,442 | 3/1994 | Emma et al. | 395/447 |
| 5,293,491 | 3/1994 | Leung et al. | 395/848 |

*Primary Examiner*—Jack A. Lane
*Attorney, Agent, or Firm*—Blakely, Sokoloff, Taylor & Zafman

[57] ABSTRACT

A method and apparatus for efficiently controlling the access to a cached shared resource such as dynamic random access memory (DRAM). The access is effected in a pseudo-concurrent manner by two devices such as a central processing unit (CPU) and a bus master agent. While one device accesses data stored in the DRAM, the other device accesses a copy of the DRAM data which is stored in the cache of the shared resource.

20 Claims, 5 Drawing Sheets

PSEUDO-CONCURRENT ACCESS TO A CACHED SHARED RESOURCE

This is a continuation of application Ser. No. 07/977,228, filed Nov. 16, 1992, now abandoned.

BACKGROUND OF THE INVENTION

1. Related Applications

This application is related to: U.S. patent application Ser. No. 07/876,577, filed Apr. 30, 1992, entitled "A Signaling Protocol for a Peripheral Computer Interconnect"; U.S. patent application Ser. No. 07/977,232, filed Nov. 16, 1992 entitled "Dynamic Cache Coherency Method and Apparatus", now U.S. Pat. No. 5,467,295; U.S. patent application Ser. No. 07/976,891 filed Nov. 16, 1992, entitled "Zero Wait State Level 2 Cache Memory using Non-interleaved Banks of Asynchronous SRAMs", now abandoned; and U.S. patent application Ser. No. 07/977,226, filed Nov. 16, 1992 entitled "Concurrent Cache Line Replacement Method and Apparatus in Microprocessor System with Write-back Cache Memory", now abandoned which are hereby incorporated fully by reference.

2. Field of the Invention

This invention relates to the field of computer system architecture. More particularly, this invention relates to method and apparatus for efficient access to a cached shared resource.

3. Art Background

In a computer system, peripheral components, such as disk drive controllers, network controllers, and graphics controllers, may be coupled to peripheral component buses separate from a host, or central processing unit (CPU) bus. There are several reasons a system might employ peripheral component buses. For example, it may be desirable to isolate slower speed devices from higher bandwidth buses and peripherals. Also, an intelligent peripheral component may have a local peripheral component bus. Moreover, the system may have more peripheral components than can be reliably placed on the host bus, due to electrical loading effects.

In such a system, a host bridge circuit or controller enables communication between the peripheral component bus and the host bus. The host bridge circuit enables an access request that initiates on the host bus to have a destination on the peripheral component bus, and enables an access request that initiates on the peripheral component bus to have a destination on the host bus. The host bridge circuit can also enable access to a shared resource from both buses. Typically, the host bridge circuit contains control logic and a set of configuration registers that define parameters for processing access cycles between the buses, and for controlling the shared resource. System I/O software performs reads and writes to the configuration registers in order to define the parameters.

It is common for the shared resource in such a system to be dynamic random access memory (DRAM). DRAM can store large amounts of data. Data stored on DRAM can be accessed more rapidly than can data stored on a random access memory device, such as a disk drive, or than data stored on a sequential access memory device, such as a magnetic tape drive. However, access to DRAM is relatively slow when compared to the data transfer speeds of a typical computer system. Therefore, it is quite common to provide a cache memory for the DRAM. A cache memory is a small amount of memory that can be accessed much faster than the DRAM. Commonly, the cache memory is composed of static random access memory (SRAM). While SRAM is more expensive than DRAM, SRAM can be accessed faster than the DRAM.

Several schemes are well known in the art to fill the cache with a copy of data which is stored in the DRAM and that is accessed frequently. Thus, if data in the DRAM is to be accessed, e.g. read or written, and a copy of that data to be accessed resides in the cache (a cache "hit"), then the access is made to the cache rather than to the DRAM. Caching permits faster access to the data than would be possible if the DRAM were accessed directly. Of course, in the case where a copy of the desired data does not reside in the cache (a cache "miss"), an access must still be made directly to the slower DRAM. If a cache miss occurs, depending upon the caching scheme implemented, the access is then made either directly to the DRAM, or to the cache after the desired data has been copied by the controller from the DRAM to the cache.

Figure 1:
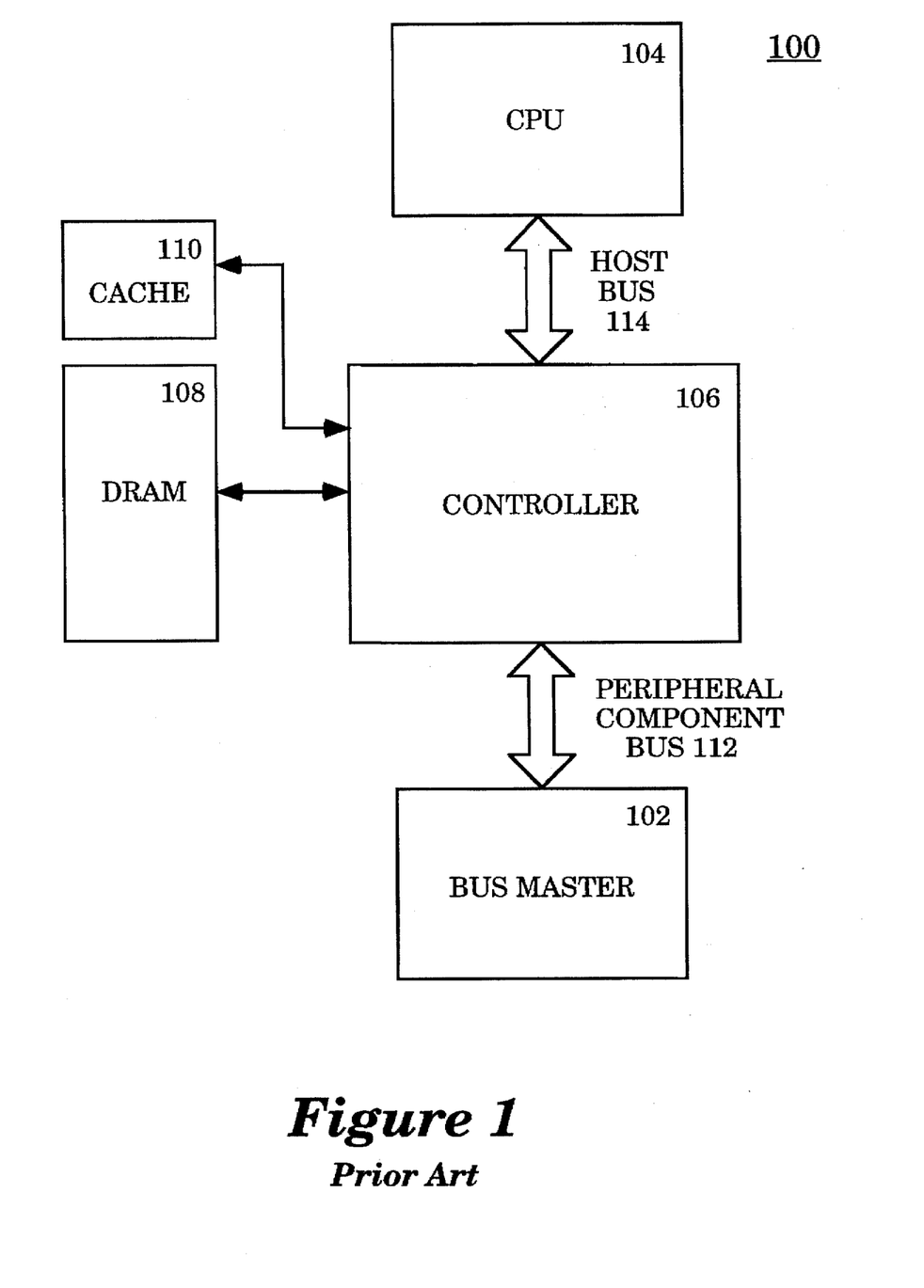
FIG. 1 illustrates a conventional computer system which permits two devices to access a shared memory resource.

Referring to FIG. 1, a computer system 100 which permits two devices to access a shared memory resource is depicted. In computer system 100, CPU 104 is coupled to controller 106 by host bus 114. Similarly, bus master agent 102, a peripheral component, is coupled to controller 106 by peripheral component bus 112. DRAM 108 and cache 110 are also coupled to controller 106. Controller 106 controls access to DRAM 108 (and cache 110) by CPU 104 and bus master 102. However, because prior art controllers such as controller 106 only permit one device, i.e. CPU 104 or bus master 102, to access a shared resource such as DRAM 108 at any given time, access to the shared resource is accomplished in an inefficient sequential manner.

Figure 2A:
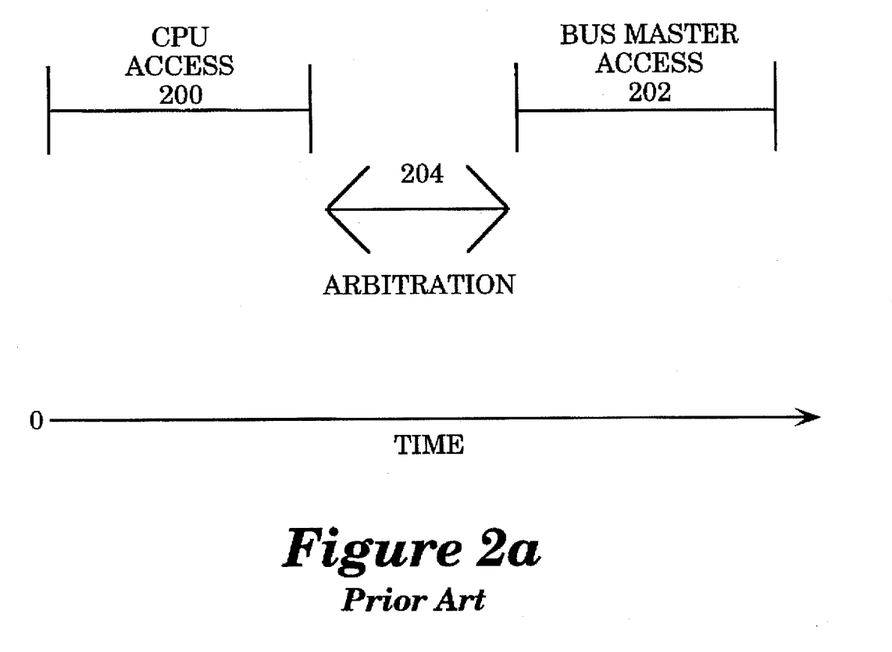
FIG. 2A illustrates an inefficient access by two devices to data of the shared memory resource shown in FIG 1.

Referring to FIG. 2a, an inefficient access by two devices to data of the shared memory resource is depicted. In the figure, a CPU access 200 to a shared resource is followed sequentially by a bus master access 202 to the same shared resource. An interval of arbitration time 204 elapses between the CPU access 200 and the bus master access 202. During arbitration time 204, the controller determines that the CPU access 200 has completed. Then controller 204 notifies both the shared resource and the bus master that bus master access 202 will begin.

Once it completes the access to the shared resource, the CPU can continue processing. However, the sequential method of access is inefficient because the bus master must remain idle while waiting for the CPU access to end and the arbitration to occur. Furthermore, if the CPU reaches a point where it must access additional data from the shared resource before it can continue processing, the CPU must then stall until the bus master access cycle and arbitration for the new CPU access completes.

As will be described, the present method and apparatus efficiently control the access to a cached shared resource such as DRAM by effecting the access in a pseudo-concurrent manner.

SUMMARY OF THE INVENTION

A method and apparatus is disclosed for efficiently controlling the access to a cached shared resource such as dynamic random access memory (DRAM). The access is effected in a pseudo-concurrent manner by two devices such as a central processing unit (CPU) and a bus master agent. While one device accesses data stored in the DRAM, the other device accesses a copy of the DRAM data which is stored in the cache of the shared resource.

One embodiment of the present invention is a computer system which includes: a CPU, a bus master agent, a host bus, a peripheral component interconnect (PCI) bus, a DRAM shared memory resource which stores addressed data, a memory cache for the DRAM, and a controller for controlling access by the CPU and bus master devices to the addressed data. The addressed data stored in the DRAM has first and second data portions. A copy of the first data portion is stored in the cache.

The control apparatus is coupled to the DRAM and the cache. The host bus, which includes an address bus, is coupled between the controller and the CPU. The peripheral component bus is coupled between the controller and the bus master.

The controller has an arbitrator which senses when the CPU is to access the first data portion and then grants the CPU access to the first data portion When the CPU has been granted access to the first data portion, an address latch stores the starting address of the first data portion.

The control apparatus also has address bus suspension circuitry. If, while the CPU is accessing the first data portion, the arbitrator senses that the bus master is to access the second data portion, the arbitrator signals the suspension circuitry. When the suspension circuitry senses that the latch has stored the starting address, the suspension circuitry causes the CPU to tri-state the address bus. Once the arbitrator senses that the address bus is tri-stated, the arbitrator grants the bus master access to the second data portion. In this way, the bus master accesses the second data portion of the DRAM concurrently with access by the CPU to the cached first data portion.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

A method and apparatus is disclosed for efficiently controlling the access to a cached shared resource such as dynamic random access memory (DRAM). In the following description, for purposes of explanation, specific numbers, materials and configurations are set forth in order to provide a thorough understanding of the present invention. However, it will be apparent to one skilled in the art that the present invention may be practiced without these specific details. In other instances, well known systems are shown in diagrammatic or block diagram form in order not to obscure the present invention unnecessarily.

Figure 2B:
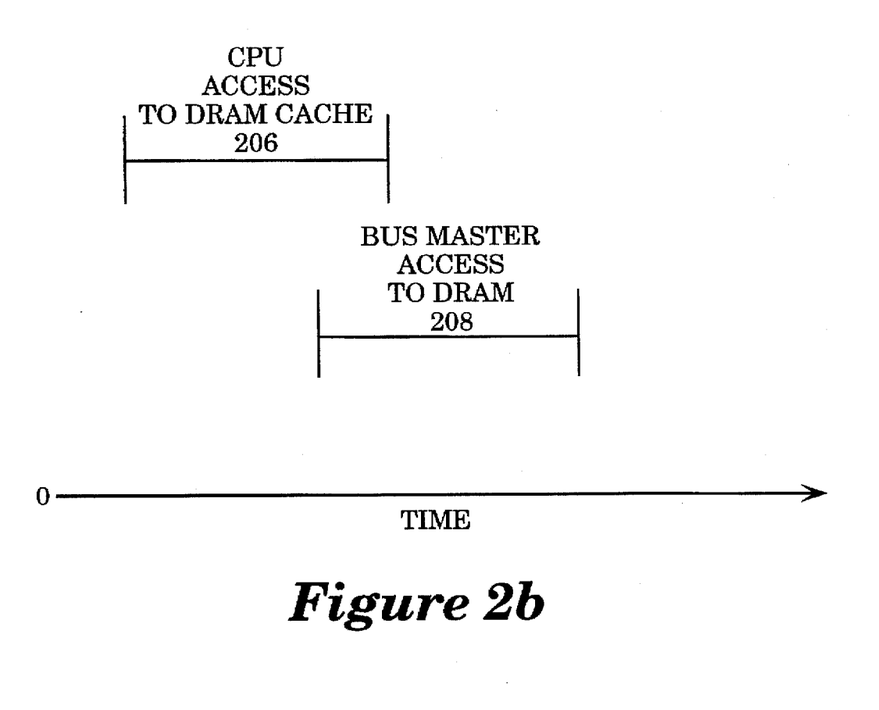
FIG. 2B illustrates a pseudo-concurrent access by two devices to data of the shared memory resource.

Referring to FIG. 2B, a pseudo-concurrent access by two devices to data of the shared memory resource is depicted. The pseudo-concurrent access can occur when a first device attempts to access data from the shared resource which is stored in the cache of the shared resource (a cache hit). In that case, a second device may access data directly from the shared resource while the first device is accessing the cached data. In this way, both devices can access data of the shared resource concurrently. However, since one device is accessing the shared resource directly, and the other device is accessing a copy of the data of the shared resource residing in a cache, there is effective, but not actual, concurrency of access.

In FIG. 2B, a bus master accesses a shared resource while a CPU is accessing data of the same resource which is stored in the DRAM cache. The CPU access to DRAM cache is represented by time interval 206. The bus master access to DRAM is represented by time interval 208. In this way, the two accesses overlap in time. Furthermore, neither device must remain idle while the other device completes its access, or while arbitration is occurring.

Figure 3:
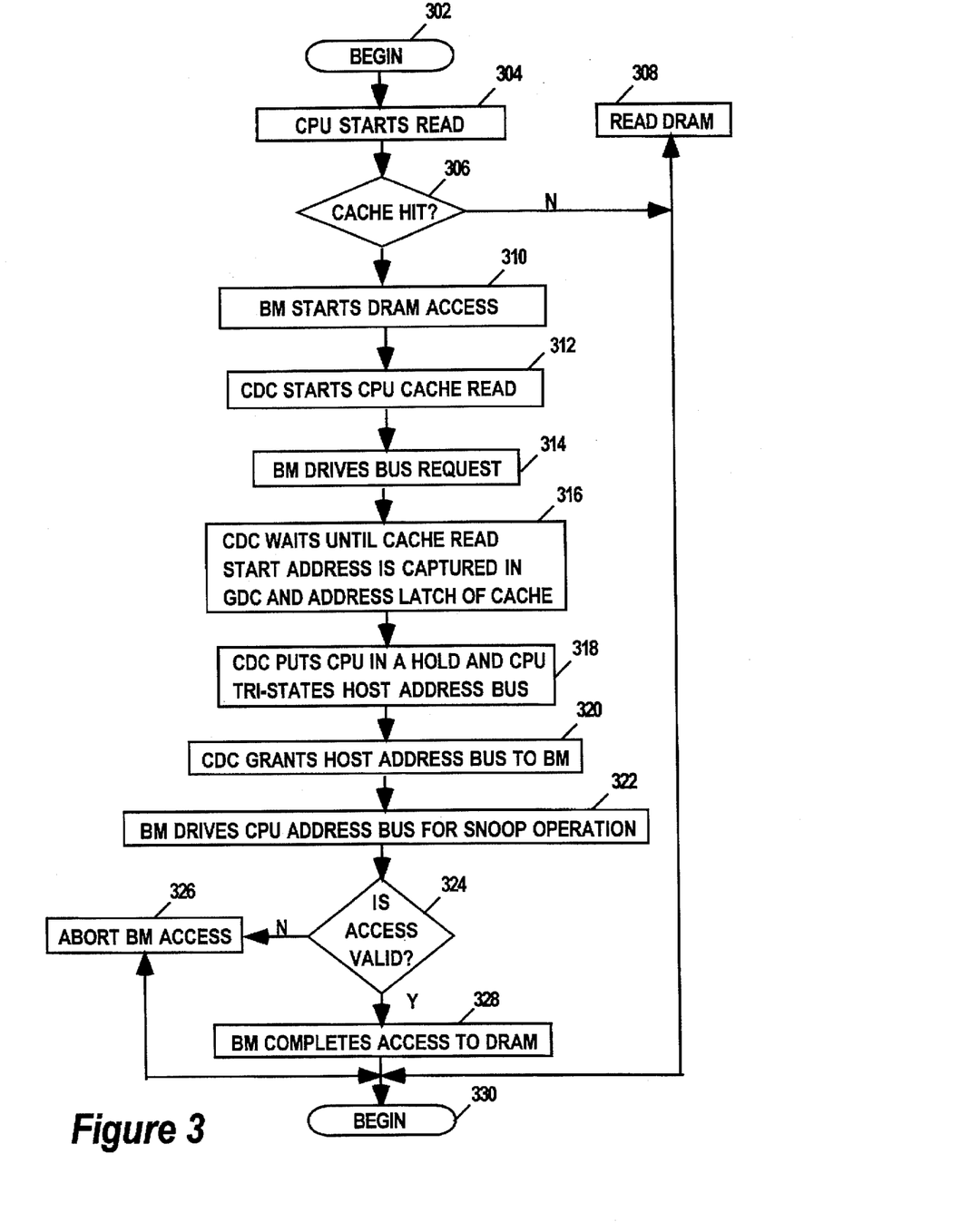
FIG. 3 illustrates a flow diagram of a pseudo-concurrent access.

Referring to FIG. 3, a flow diagram of a pseudo-concurrent access is depicted. While the example of FIG. 3 depicts a read operation by the first device (a CPU), it will be obvious to one skilled in the art that the access operation could be some other access operation, e.g. a write operation. Furthermore, while, in the example of FIG. 3, the first device to access the shared resource is a CPU and the second device to access the shared resource is a bus master, it will be obvious to one skilled in the art that these are merely representative devices and that the teachings of the present invention can readily be utilized by other devices. Moreover, while the example describes the shared resource as being DRAM, it will be obvious to one skilled in the art that the teaching of the present invention applies equally to any cached shared resource.

In the flow diagram of FIG. 3, the pseudo-concurrent access sequence begins at bubble 302 and progresses immediately to logic block 304 where the first device (the CPU) initiates a read to the shared access resource (DRAM). In decision block 306, a determination is made as to whether the data to be read by the CPU from the shared resource is stored in the cache (a cache hit). If a cache hit has not occurred, then the CPU must read the DRAM directly (as depicted in logic block 308) and the benefits of the pseudo-concurrent access scheme cannot be realized for this particular access sequence. Thus, the process ends at bubble 330 upon completion of the DRAM read by the CPU (logic block 308).

If, however, a cache hit has occurred, then the logic proceeds through the path depicted by logic blocks 310–322. In logic block 310, the bus master attempts to access the shared resource. In logic block 312, the cache-DRAM controller (CDC) starts control of a CPU read of the cache. In logic block 314 the second device (the bus master) drives the peripheral component bus to request access to the DRAM from the CDC. In logic block 316, the CDC waits until the starting address of the data to be read by the CPU from the cache is captured both by the CDC and by an address latch of the cache. Once this has occurred, the CDC asserts an address bus hold (AHOLD) on the address bus of the CPU's host bus. This, in turn, causes the CPU to tri-state the host bus address bus (logic block 318). The CDC then grants the host address bus to the bus master (logic block 320) and the bus master drives the host bus address bus for a "snoop" operation (logic block 322).

Snoop operations are commonly used and well known in the art. A snoop operation permits the CDC to determine whether the DRAM data at the address which the bus master is to access has been stored in a cache. The cache could either be the cache for the DRAM, which is external to the CPU, or a cache internal to the CPU. If the data which the bus master is to access is stored in a cache, and the cached copy of the data has been changed so that it no longer matches the corresponding data stored in the DRAM (by a write operation, for example), then the bus master cannot make a valid access to the shared resource DRAM until the DRAM data has been updated by the cache to reflect the proper status of the data. In the case where the DRAM data to be accessed is invalid, the CDC aborts the bus master access (logic block 326). If, however, the access is valid, then the bus master can complete access to the DRAM (logic block 328) while the CPU is still reading the cached data from the DRAM cache thereby yielding pseudo-concurrent accesses. In any event, the process ends at bubble 330.

While FIG. 3 represents a possible sequence for a pseudo-concurrent access, it will be obvious to one skilled in the art that some modification may be made to the sequence, while still yielding pseudo-concurrent access to the cached shared resource. For example, the CDC could begin control of the CPU cache read (logic block 312) before the bus master begins DRAM access (logic block 310). Moreover, it will be appreciated by one skilled in the art that well known collision avoidance methods can and may be employed to prevent deadlock between the CPU and the bus master. For example, if a deadlock occurs, the CDC can assert a host bus signal to cause the CPU to back-off and then retry access at a later time thereby aborting the CPU access cycle and breaking the deadlock.

Figure 4:
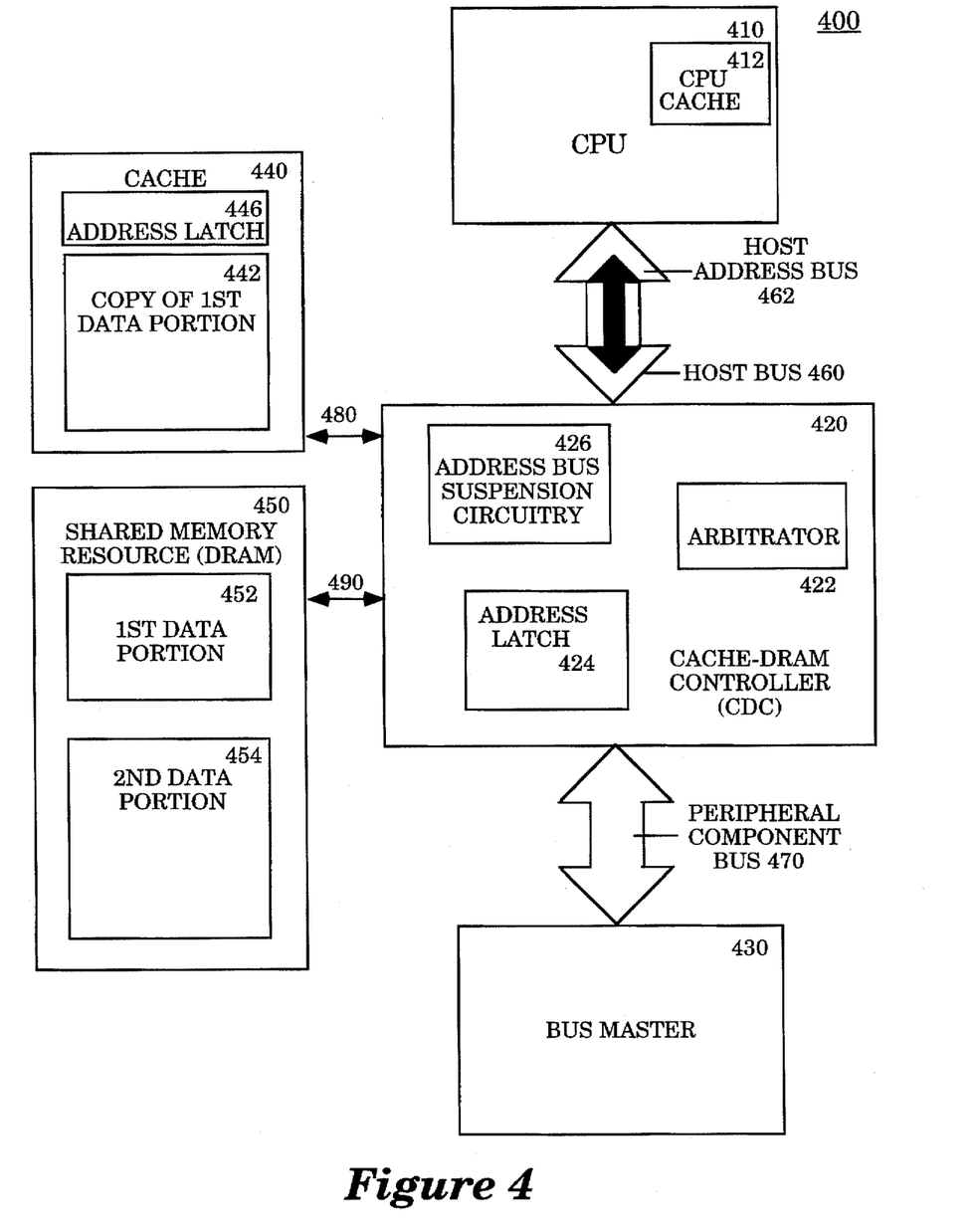
FIG. 4 illustrates a computer system which permits two devices to access a cached shared memory resource in a pseudo-concurrent manner.

Referring to FIG. 4, one embodiment is depicted of a computer system 400 which uses the teachings of the present invention to permit two devices to access a cached shared memory resource in a pseudo-concurrent manner.

Computer system 400 includes: a CPU 410, a bus master agent 430, a host bus 460, a peripheral component interconnect bus 470, a DRAM 450 shared memory resource which stores addressed data, a memory cache 440 for the DRAM 450, and cache-DRAM controller (CDC) circuitry 420 for controlling access by the CPU 410 and bus master 430 devices to the addressed data. The addressed data stored in the DRAM 450 has first and second data portions 452 and 454. A copy 442 of the first data portion 452 is stored in the cache 440.

In computer system 400, DRAM 450 and its associated cache 440 are coupled to cache-DRAM controller (CDC) circuit 420 by signal lines 480 and 490, respectively. Bus master 430 is coupled to CDC 420 by peripheral component (PCI) bus 470. Similarly, CPU 410 is coupled to CDC 420 by host bus 460. Address bus 462 is a part of host bus 460.

Data portions 452 and 454 are stored on DRAM 450. Similarly, copy 442 of data portion 452 is stored in cache 440. Cache 440 also has an address latch 446. In this embodiment, CPU 410 stores data in an internal CPU cache 412. Therefore, data stored in DRAM 450 can reside in internal cache 412, as well as, in external cache 440.

Arbitrator circuitry 422, address bus suspension circuitry 426 and address latch 424 each are parts of CDC 420. Arbitrator 422 senses when the CPU 410 is to access the first data portion 442 (i.e. a cache hit) and then grants the CPU 410 access to the first data portion 442. When the CPU 410 has been granted access to the first data portion 442, address latches 446 and 424 store the starting address of the first data portion 442.

If, while the CPU 410 is accessing the first data portion 442, the arbitrator 422 senses that the bus master 430 is to access the second data portion 454, the arbitrator 422. Signals the suspension circuitry 426. When the suspension circuitry 426 senses that the latches 446 and 424 have stored the starting address of the first data region 444, the suspension circuitry 426 causes the CPU 410 to tri-state the address bus 462. Once the arbitrator 422 senses that the address bus 462 has been tri-stated, the arbitrator 422 grants the bus master 430 access to the second data portion 454. In this way, the bus master 430 accesses the second data portion 454 of the DRAM 450 concurrently with access by the CPU 410 to the first data portion 442 (stored by cache 440).

Figure 5:
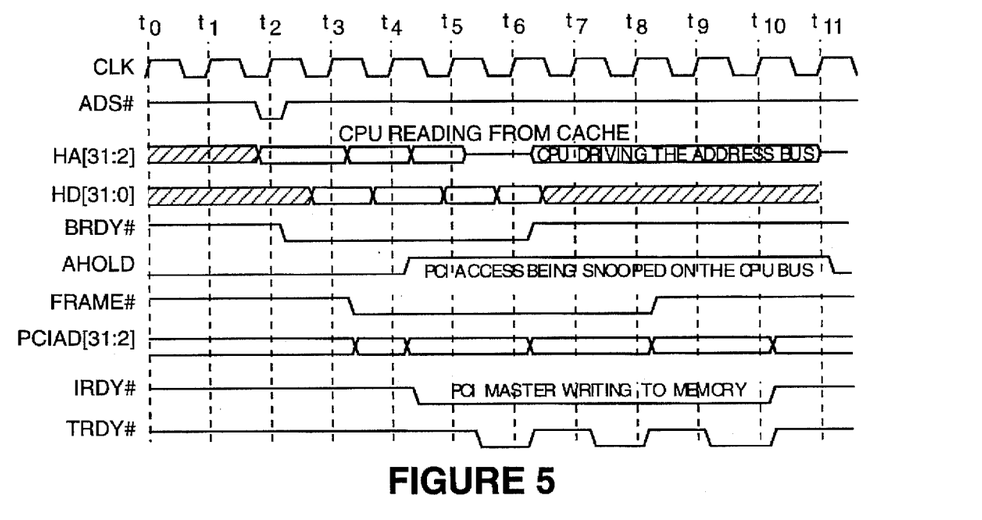
FIG. 5 illustrates a timing diagram of a pseudo-concurrent access.

Referring to FIG. 5, a timing diagram of a pseudo-concurrent access is depicted. While FIG. 5 utilizes signals which are appropriate for host bus 460 and peripheral component bus 470, it will be appreciated by one skilled in the art that the teachings of the present invention can be easily generalized to other buses which use different signals and protocols.

The clock (CLK) signal synchronizes transactions on the host and PCI buses. In the example of FIG. 5, bus transactions occur on the rising edge of each clock signal. However, it will be appreciated by one skilled in the art that other transaction synchronization methods (such as using the trailing edge of the clock signal) can be employed without departing from the spirit of the invention.

The host address (HA) signal is a 30 bit signal which is used by the CPU to communicate to the CDC over the host bus the starting DRAM address which the CPU intends to access during a CPU-DRAM access cycle. Later, the CDC drives the address bus when performing snoop operations during a bus master access to the DRAM.

The host data (HD) signal is a 32 bit signal used by the CPU to transfer data to the CDC over the host bus during a write operation. It is also used by the CDC to transfer data from the CDC to the CPU across the host bus during a CPU read operation.

The peripheral component interconnect address/data (PCIAD) signal is a 32 bit time multiplexed signal which is used by the bus master to communicate to the CDC the initial DRAM address to be addressed in an access cycle initiated by the bus master. During a bus master write access cycle, the PCIAD signal carries data to the CDC which is to be written by the bus master to the DRAM. During a bus master read access cycle, the PCIAD signal carries data (retrieved by the CDC from the DRAM) to the bus master from the CDC.

The address hold (AHOLD) signal is an output signal of the CDC to the host bus. AHOLD forces the CPU to float its address bus on the next bus cycle. The CDC asserts this signal in preparation to perform cache invalidation or cache inquiry cycles. In the protocol of this example, the CDC always drives the address on the host bus during the third clock period from which AHOLD was asserted and continues to drive the addresses until AHOLD is negated.

The address status (ADS#) signal is an input signal to the CDC from the host bus. ADS# is a strobe signal which indicates addresses and a number of related control signals are available on their corresponding host bus signal lines. When ADS# is asserted, it means that the CPU is starting an access. ADS# is only asserted for one cycle.

The burst ready (BRDY#) signal is an output signal from the CDC to the host bus. BRDY# indicates that the current burst bus cycle of four consecutive D-word transfers is complete. In so doing, BRDY# indicates that the system has presented valid data in response to a read, or that the system has accepted data in response to a write.

The cycle frame (FRAME#) signal is an output from the CDC to the PCI bus when the CDC acts as a master on the PCI bus. FRAME# is driven by the CDC to indicate the beginning and duration of an access. FRAME# is asserted to indicate that a transaction is beginning. While FRAME# is asserted, data transfer continues. When FRAME# is deasserted, the transaction is in the final data phase. FRAME# is an input to the CDC when the CDC acts as a PCI slave. When the CDC acts as a target on the PCI bus, it latches the PCI bus multiplexed address/data (PCIAD) signal on the clock edge on which it samples FRAME# active.

The target ready (TRDY#) signal is an input from the PCI bus to the CDC when the CDC acts as a master on the PCI bus. Assertion of TRDY# indicates the target agent's ability to complete the current data phase of the transaction. For read cycles, TRDY# indicates that the target has driven valid read data onto the PCI local bus. For a write cycle, TRDY# indicates that the target is prepared to accept write data from the PCI bus. TRDY# is an output of the CDC when the CDC acts as a PCI slave.

The initiator ready (IRDY#) signal is an output to the PCI bus from the CDC when the CDC acts as a master on the PCI bus. Assertion of IRDY# indicates the current PCI bus master's ability to complete the current data phase of the transaction. For read cycles, IRDY# indicates that the PCI master is prepared to accept the read data from the PCI bus on the following rising edge of the PCI clock. For a write cycle, IRDY# indicates that the master has driven valid write data onto the PCI bus. IRDY# is an input to the CDC when the CDC acts as a PCI slave agent.

In FIG. 5, the CPU asserts signal ADS# at time T2 to indicate that the CPU will make a burst access to DRAM. The CDC then identifies that the CPU access target is towards the cache (a cache hit). Therefore, the CDC will provide the requested data to the CDC from the cache, rather than directly from DRAM. In this example, the CDC controls a 2-1-1-1 burst access from the cache by the CPU. In a 2-1-1-1 burst access, the first data access of a burst takes two clock cycles and the subsequent accesses of the burst take one clock each.

In the example, at time T4 (two clocks after the ADS# signal was asserted), the PCI bus master agent asserts the FRAME# signal to start a bus master access to the DRAM. In the PCI bus protocol, the PCIAD signal is time multiplexed between the starting address and the data to be addressed. Therefore, FRAME# is asserted by the bus master with the address where the bus master will begin the access. Then, on the next clock (T5), because this is a bus master write operation, the PCIAD signal is asserted by the bus master with the first data to write to the address.

Also, on the next clock (T5), the CDC tri-states the CPU address bus by asserting AHOLD. Two clocks later (at time T7), the CDC starts driving the snoop address on the host address bus (HA). During the time that the PCI master is writing to memory, the CDC continues to snoop the access address on the host bus and at the same time provide data to the CPU from the cache.

In the example of FIG. 5, there is a string of data being written by the bus master to the DRAM memory. The starting address of the PCI access is snooped on the CPU bus by the CDC. In one embodiment, the CDC does not have to snoop for the next three bus master transfers. This is because each cache line contains four memory address locations, and the CDC only has to snoop once per cache line. However, every time the cache line changes, the CDC must provide a new address on the host address bus to be snooped.

While the example of FIG. 5 involves a CPU read operation from DRAM cache and a bus master write operation to DRAM, it will be obvious to one skilled in the art that the teachings of the present invention apply equally to a CPU write operation to cache, as well as to a bus master read operation from DRAM.

Figure 6:
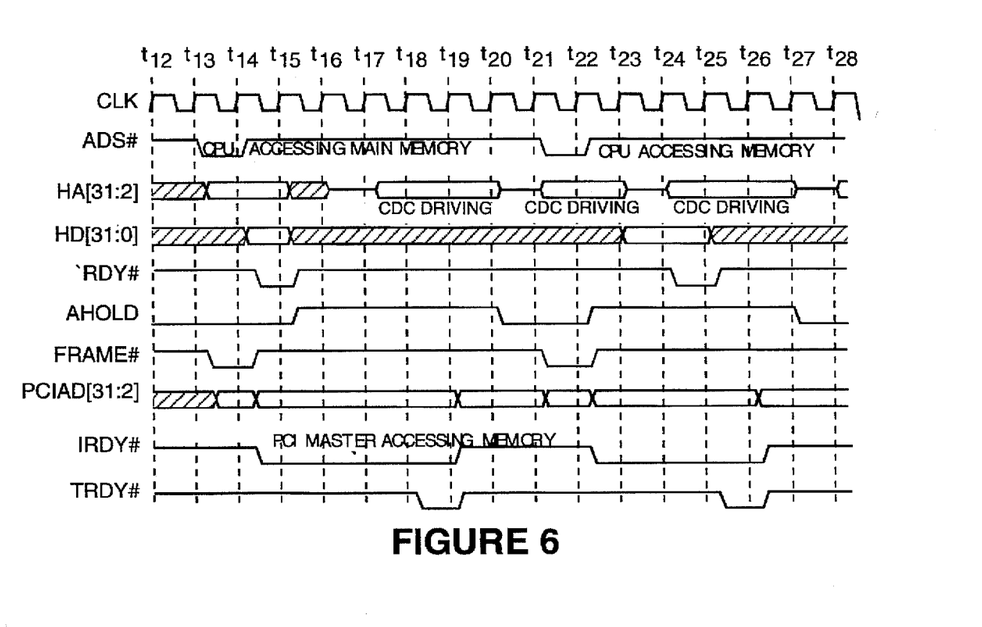
FIG. 6 illustrates the use of the AHOLD signal to provide time multiplexing between a CPU and a bus master.

Referring to FIG. 6, the use of the AHOLD signal to provide time multiplexing between a CPU and a bus master is illustrated. When employed in this way, the AHOLD signal can be used to provide efficient sequential access directly to DRAM (instead of to the cache) by two devices.

Normally, when a PCI master accesses DRAM or when the PCI master accesses any other slave device on the PCI bus, the CPU is put on hold by the CDC. The master continues to keep the CPU on hold until the master access completes. When this happens, until the master completes its access, there is no way for the CDC to sense that the CPU needs to make an access.

However, in the example of FIG. 6, the CDC places the CPU on AHOLD. Then, the bus is snooped by the CDC as before when the PCI master is accessing memory. However, between two back-to-back PCI transfers, the CDC deasserts the AHOLD signal to sense whether the CPU needs to access memory. In this way, the CPU is not locked out of the bus totally during a bus master access. If the check made by the CDC between back-to-back master transfers indicates that the CPU needs to make an access, the CDC can then stall the second access of the back-to-back master access to permit the CPU to make its access. Note that in the example, the RDY# signal serves the same function for a single access transaction as does the BRDY# signal for a burst access transaction. Then, once the CPU has completed its access, the CDC can give back the bus to the PCI master. Thus, one PCI master cannot hog the bus and thereby keep the CPU idle.

While the method of the present invention has been described in terms of its presently preferred and alternate embodiments, those skilled in the art will recognize that the method of the present invention may be practiced with modification and alternation within the spirit and scope of the appended claims. The specifications and drawings are, accordingly, to be regarded in an illustrative rather than a restrictive sense.

We claim:

1. A controller method, comprising:
   receiving a first address from a host address bus, the first address identifying a first memory location to be accessed by a CPU;
   if data of the first address is cached in a secondary cache, latching the first address and permitting access by the CPU to the data of the first address cached in the secondary cache;
   signaling the CPU to tri-state the host address bus;
   receiving a second address from a component bus, the second address identifying a second memory location to be accessed by a bus master;
   using the host address bus to snoop the second address to determine whether or not data of the second address stored in main memory is valid; and
   if the data of the second address stored in the main memory is valid, permitting the bus master to access the data of the second address from the main memory while the CPU is accessing the data of the first address from the secondary cache.

2. The controller method, as set forth in claim 1, wherein the CPU has an associated CPU cache and the data of the second address stored in the main memory is not valid if the CPU has modified in the CPU cache a copy of the data of the second address stored in the main memory.

3. The controller method, as set forth in claim 1, wherein the data of the second address stored in the main memory is not valid if the CPU has modified a copy in the secondary cache of the data of the second address stored in the main memory.

4. The controller method as set forth in claim 1, wherein the first and second address are the same.

5. The controller method, as set forth in claim 1, further comprising the steps of:
 receiving a third address from the component bus, the third address identifying a third main memory location, of a plurality of main memory locations, to be accessed by the bus master in a back-to-back access;
 while the main memory location of the first address is being accessed by the bus master, signaling the CPU to tri-state the host address bus;
 after each access of the back-to-back access, permitting the CPU to use the host address bus to indicate a fourth address to be accessed by the CPU, and, if the CPU indicates the fourth address, ordering the bus master to defer completion of the back-to-back transfer until the CPU access has completed.

6. A controller, comprising:
 means for receiving a first address from a host address bus, the first address identifying a first memory location to be accessed by a CPU;
 means for latching the first address and permitting access by the CPU to the data of the first address cached in a secondary cache, if data of the first address is cached in the secondary cache;
 means for signaling the CPU to tri-state the host address bus;
 means for receiving a second address from a component bus, the second address identifying a second memory location to be accessed by a bus master;
 means for using the host address bus to snoop the second address to determine whether data of the second address stored in main memory is valid; and
 means for permitting the bus master to access the data of the second address from the main memory while the CPU is accessing the data of the first address from the secondary cache, if valid data is stored in the main memory second address.

7. The controller, as set forth in claim 6, wherein the CPU has an associated CPU cache and the data of the second address stored in the main memory is not valid if the CPU has modified in the CPU cache a copy of the data of the second address stored in the main memory.

8. The controller, as set forth in claim 6, wherein the data of the second address stored in the main memory is not valid if the CPU has modified a copy in the secondary cache of the data of the second address stored in the main memory.

9. The controller, as set forth in claim 6, wherein the first and second address are the same.

10. The controller, as set forth in claim 6, further comprising:
 means for receiving a third address from the component bus, the third address identifying a third main memory location, of a plurality of main memory locations, to be accessed by the bus master in a back-to-back access;
 means for signaling the CPU to tri-state the host address bus, while the main memory location of the first address is being accessed by the bus master; and
 means for permitting the CPU to use the host address bus to indicate a fourth address to be accessed by the CPU, after each access of the back-to-back access, and, if the CPU indicates the fourth address, for ordering the bus master to defer completion of the back-to-back transfer until the CPU access has completed.

11. A controller, comprising:
 host address receiver, to receive a first address from a host address bus, the first address identifying a first memory location to be accessed by a CPU;
 latching circuitry, coupled to the host address receiver, the latching circuitry to latch the first address and permit access by the CPU to the data of the first address cached in a secondary cache, if data of the first address is cached in the secondary cache;
 signaling circuitry, coupled to the latching circuitry, the signaling circuitry to signal the CPU to tri-state the host address bus;
 component bus address receiver to receive a second address from a component bus, the second address identifying a second memory location to be accessed by a bus master; and
 means for using the host address bus to snoop the second address to determine whether data of the second address stored in main memory is valid to permit the bus master to access the data of the second address from the main memory while the CPU is accessing the data of the first address from the secondary cache, if valid data is stored in the main memory second address.

12. The controller, as set forth in claim 11, wherein the CPU has an associated CPU cache and the data of the second address stored in the main memory is not valid if the CPU has modified in the CPU cache a copy of the data of the second address stored in the main memory.

13. The controller, as set forth in claim 11, wherein the data of the second address stored in the main memory is not valid if the CPU has modified a copy in the secondary cache of the data of the second address stored in the main memory.

14. The controller, as set forth in claim 11, wherein the first and second address are the same.

15. The controller, as set forth in claim 11, further comprising:
 means for receiving a third address from the component bus, the third address identifying a third main memory location, of a plurality of main memory locations, to be accessed by the bus master in a back-to-back access;
 means for signaling the CPU to tri-state the host address bus, while the main memory location of the first address is being accessed by the bus master; and
 means for permitting the CPU to use the host address bus to indicate a fourth address to be accessed by the CPU, after each access of the back-to-back access, and, if the CPU indicates the fourth address, for ordering the bus master to defer completion of the back-to-back transfer until the CPU access has completed.

16. A system comprising:
 a central processing unit (CPU);
 a secondary cache;
 a main memory;
 a bus master;
 a component bus;
 a host bus; and
 a controller, including:
  means for receiving a first address from the host address bus, the first address identifying a first memory location to be accessed by the CPU;

means for latching the first address and permitting access by the CPU to the data of the first address cached in the secondary cache, if data of the first address is cached in the secondary cache;

means for signaling the CPU to tri-state the host address bus;

means for receiving a second address from the component bus, the second address identifying a second memory location to be accessed by the bus master;

means for using the host address bus to snoop the second address to determine whether data of the second address stored in the main memory is valid; and means for permitting the bus master to access the data of the second address from the main memory while the CPU is accessing the data of the first address from the secondary cache, if valid data is stored in the main memory second address.

17. The system, as set forth in claim 16, further comprising a CPU cache associated with the CPU, the data of the second address stored in the main memory being not valid if the CPU has modified, in the CPU cache, a copy of the data of the second address stored in the main memory.

18. The system, as set forth in claim 16, wherein the data of the second address stored in the main memory is not valid if the CPU has modified a copy in the secondary cache of the data of the second address stored in the main memory.

19. The system, as set forth in claim 16, wherein the first and second address are the same.

20. The system, as set forth in claim 16, the controller further comprising:

means for receiving a third address from the component bus, the third address identifying a third main memory location, of a plurality of main memory locations, to be accessed by the bus master in a back-to-back access;

means for signaling the CPU to tri-state the host address bus, while the main memory location of the first address is being accessed by the bus master; and means for permitting the CPU to use the host address bus to indicate a fourth address to be accessed by the CPU, after each access of the back-to-back access, and, if the CPU indicates the fourth address, for ordering the bus master to defer completion of the back-to-back transfer until the CPU access has completed.

* * * * *